United States Patent [19]

Huang et al.

[11] Patent Number: 5,386,243
[45] Date of Patent: Jan. 31, 1995

[54] GHOST SIGNAL CANCELLATION SYSTEM FOR TELEVISION SIGNALS

[75] Inventors: Jinshi Huang, San Jose; Robert F. Casey, Santa Clara, both of Calif.

[73] Assignee: Zoran Corporation, Santa Clara, Calif.

[21] Appl. No.: 96,156

[22] Filed: Jul. 22, 1993

[51] Int. Cl.⁶ .............................. H04N 5/213
[52] U.S. Cl. ............................ 348/607; 348/614
[58] Field of Search ............... 358/167, 166, 905, 36, 358/37, 160, 21 V; H09N 5/21, 5/213, 5/208; 348/614, 607, 611

[56] References Cited

U.S. PATENT DOCUMENTS 5,053,870 10/1991 Ho et al. ..................... 358/905

FOREIGN PATENT DOCUMENTS

| 0120965 | 5/1991 | Japan | H04N 5/21 |
| 4068673 | 3/1992 | Japan | H04N 5/21 |
| 4079678 | 3/1992 | Japan | H04N 5/21 |
| 4138778 | 5/1992 | Japan | H04N 5/21 |
| 5037824 | 2/1993 | Japan | H04N 5/21 |

*Primary Examiner*—Victor R. Kostak
*Assistant Examiner*—Michael H. Lee
*Attorney, Agent, or Firm*—Townsend and Townsend Khourie and Crew

[57] ABSTRACT

A ghost cancellation system for filtering out ghosts in a received video signal including an active filter having a filtering function defined by a first set of coefficients ($ak_{old}$) and having a input and a output. A transmitted ghost cancellation reference (GCR) signal is applied to the input of the active filter during a vertical blanking period to generate a filtered GCR signal at the output of the active filter. The filtered GCR signal is compared with a ghostless GCR signal to obtain an error signal, and the filter coefficients are adjusted based on the error signal to obtain a set of new coefficients ($ak_{new}$). The active filter includes a feedforward FIR filter and an adder serially connected between the input and the output, a feedback IIR filter and a switch serially connected between the output and-the adder, the feedforward FIR filter and the feedback IIR filter having filtering functions defined by the coefficients. The active filter is reconfigurable as a matched filter by passing the error signal serially through the feedforward FIR filter and the feedback IIR filter, the matched filter receiving the error signal and producing a set of impulses ($dk$) which represent received ghost delays and coefficients where $$dk = \sum_{j=0}^{N} X(j) \cdot e(j+k)$$

where x(j) is time-reversed sequence of the coefficients in the bank (ideal GCR sequence), and e(j+k) is the difference between the received average GCR and the reference GCR.

16 Claims, 1 Drawing Sheet

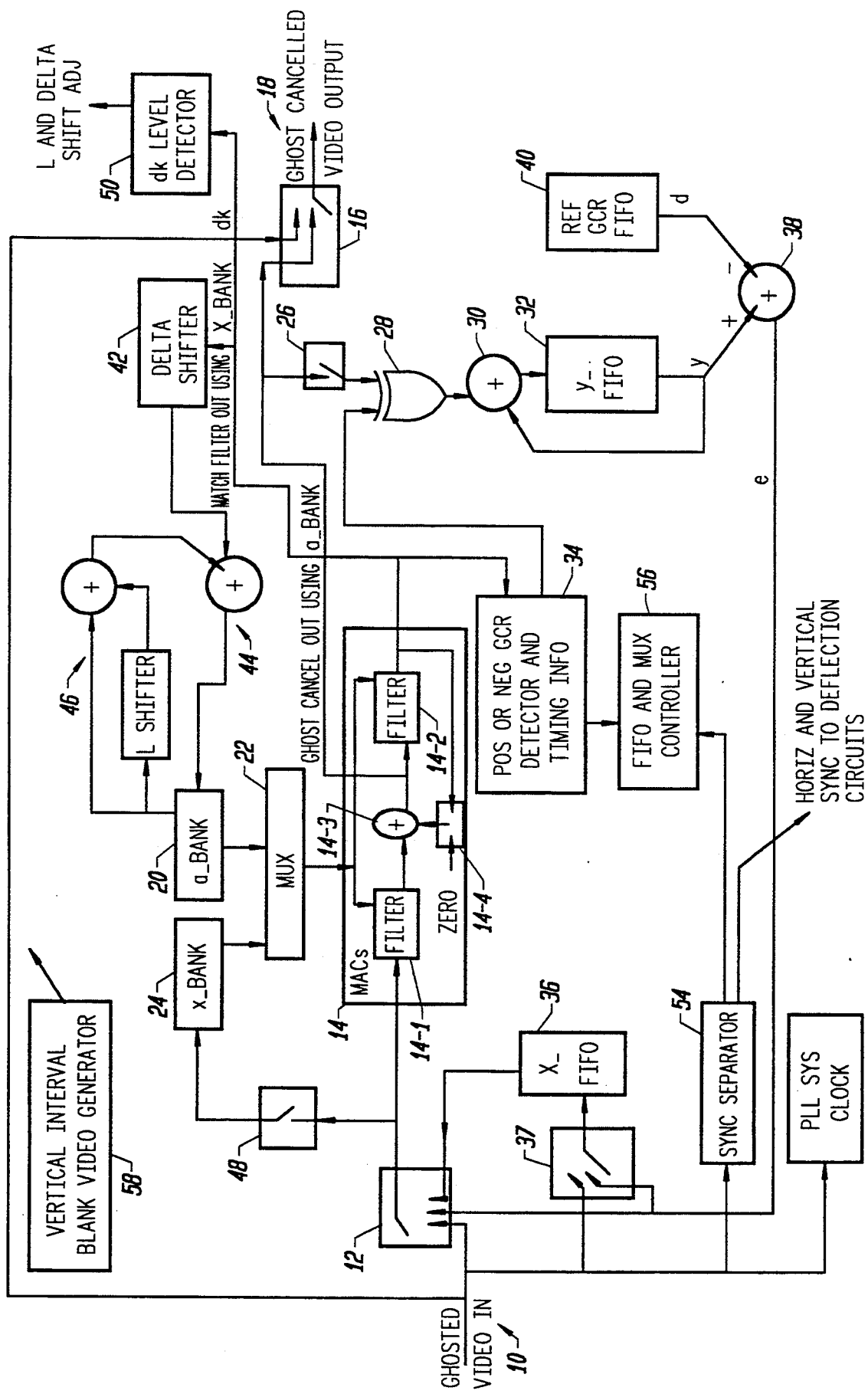

GHOST SIGNAL CANCELLATION SYSTEM FOR TELEVISION SIGNALS

BACKGROUND OF THE INVENTION

This invention relates generally to television signal processing circuitry, and more particularly the invention relates to circuitry for ghost signal cancellation in television signals in all broadcasting standards.

Echo signals or ghost signals have been one of the major problems in modern television transmission. When a transmitted signal is received from the air, ghosts can be caused by reflections from mountains, buildings, and the like. In a television signal received through cable, the ghosts can be due to discontinuities of the connectors. Although the ghosts are generated in a radio frequency spectrum, the process in which the ghost is created can be accurately modelled as a linear distortion in a baseband signal. Therefore, cancelling the ghosts can be accomplished by passing the baseband signal through a linear filter which is an inverse of the linear model of the ghosting process.

Prior efforts in eliminating ghosts used analog technology such as a charge coupled device (CCD) transversal filter which did not produce significant improvement due to inaccuracy of the filter. More recently, a ghost canceller reference (GCR) signal has been proposed for use in training of filters. Digital filters have become widely accepted as alternative methods to implement the ghost cancellers.

Ghost signals can arrive at a receiver before and after the main signal, resulting in a precursor ghost and post-cursor ghost, respectively. A filter to cancel the precursor ghost is a physically non-realizable infinite impulse response (IIR) filter, which can be approximated by a longer finite impulse response (FIR) filter. The postcursor ghost can be cancelled by an IIR filter. Therefore, the typical digital filter to cancel the ghost signals is an FIR feedforward filter followed by an IIR feedback filter.

In order to calculate the filter coefficients, a ghost canceller reference (GCR) signal is transmitted from the broadcasting station, typically in one line of the vertical blanking interval (VBI). The coefficient of the filters can be estimated by comparing the received GCR signal with a stored standard GCR signal. In order to cancel the unknown ghosts, the filters have to be able to adapt to different situations. Current methods of ghost cancellation are done by capturing the GCR data and then sending the data to a separate computing device, such as a DSP or microprocessing system, which then does calculations to determine the ghosts in the GCR data. The system then programs the coefficients of a set of filters for the video filtering.

The present invention is directed to a ghost cancellation system in which a signal processor or microprocessor is not required in updating coefficients in the feedforward and feedback filters of the active video ghost filter.

SUMMARY OF THE INVENTION

In accordance with the invention the active video filter is used during a vertical blanking interval of a video signal to process a ghost canceler reference (GCR) signal and update the coefficients of the active filter. A filtered ghost reference signal is compared with a stored ghost reference signal, and the difference is processed as an error signal to update the coefficients for the active filter. The process is repeated iteratively until the error signal is at or near zero.

In one embodiment, the coefficients for the active filter are stored in a first bank, and coefficients for a GCR matched filter (the time reversal of the ideal GCR) are stored in a second bank. During normal video signal processing, the active filter receives and filters the video signal to remove ghost signals using the stored filter coefficients in the first bank. During a vertical blanking interval, a received ghost reference signal is cyclically filtered by the active filter, and the accumulated (average) filtered ghost signal is compared with a stored reference ghost signal with the difference therebetween being an error signal, e. The active filter is reconfigured as a matched filter using the coefficients in the second bank, and the error signal is then filtered to produce the mathematical cross-correlation between e and the ideal GCR, which is a set of impulses which represent received ghost delays and coefficients, dk, wherein $$dk = \sum_{j=0}^{N} X(j) \cdot e(j + k)$$

where x(j) is the ideal GCR sequence (time-reversed sequence of coefficients in the bank), and e(j+k) is the difference between the received average GCR and the reference GCR.

The ghost delays and coefficients (ak) are attenuated (Δ) and added to attenuated (L) filter coefficients in the first bank to produce updated filter coefficients for the first bank, as follows:

$$ak_{new} = (1-L)ak_{old} + \Delta dk$$

The process implements a cross-correlation algorithm in updating the coefficients. The updating process is continued to create a convergence action of the cross-correlation algorithm.

The invention and objects and features thereof will be more readily apparent from the following detailed description and independent claims when taken with the drawing.

BRIEF DESCRIPTION OF THE DRAWINGS

The figure is a functional block diagram of a ghost signal cancellation system in accordance with one embodiment of the invention.

DESCRIPTION OF THE PREFERRED EMBODIMENT

Referring now to the drawing, a video signal with ghosts is applied at an input 10, passed through a three-position switch 12 to an active filter 14 for removing the ghosts, and then through two-position switch 16 to the ghost cancelled video output 18. The active filter 14 includes a FIR feedforward filter 14-1 followed by an IIR feedback filter 14-2. The active filter is configured by coefficients stored in an a bank 20 which are passed through mux 22 to the active filter. A second coefficient bank 24 stores coefficients to configure the active filter 14 as a matched filter, as will be described hereinbelow.

During the vertical blanking interval, the filter 14 is configured as a matched filter and the received GCR is sent through the filter to determine polarity and timing of the GCR. Also, the received GCR is stored into FIFO 36 via switch 37. The captured GCR in FIFO 36 is then passed through the active filter 14, configured as an initially unconverged ghost canceler filter, switch 26, exclusive OR gate 28, to an accumulation or averaging loop including adder 30 and FIFO 32. The exclusive OR gate 28 responds to a signal from the positive/negative GCR detect or and timing circuit 34 which determines if the incoming GCR signal is positive or negative with the active filter configured as a matched filter with coefficients from bank 24. At the same time, the GCR signal is stored in FIFO 36 for timed passage through the filter 14. The detector 34 also measures the capture timing of the GCR signal stored in FIFO 36 to control the playout of the FIFO signal and remove the effects of pixel mistiming jitter.

Initially, the coefficients stored in bank 20 will configure the active filter 14 as an all pass filter, but as the recalculated coefficients converge, the coefficients will configure the active filter 14 as a ghost cancel filter for the GCR signal. At least eight fields (or a multiple of eight) are captured by adder 30 and FIFO 32 and then added or subtracted (as required) by the adder circuit 30 and accumulated into the FIFO 32. The accumulated value or average GCR in FIFO 32 is then passed to adder 38 along with a stored reference GCR signal in FIFO 40. FIFO 40 can include means for customizing the filter frequency response by modifying the reference GCR signal. Average GCR and reference GCR are subtracted in the adder 38 to produce an error signal, e. The error signal e is the difference between a clean GCR signal and the received and filtered GCR signal. The error signal is then passed through switch 12 back to the active filter 14 which is now programmed by bank 24 to act as a matched filter, the matched filter producing a set of impulses which represent the received ghost delay and coefficients, dk. The matched filter produces a math cross-correlation and generates the values of dk as follows:

$$dk = \sum_{j=0}^{N} X(j) \cdot e(j + k)$$

where x(j) is the ideal GCR sequence (time-reversed sequence of coefficients in the bank), and e(j+k) is the difference between the average GCR and the reference GCR.

The dk signal is then attenuated by a Δ shifter 42 and added by adder 44 to the coefficients stored in the bank 20 which are passed through an attenuater shifter shown at 46 which multiples the coefficients by a (1-L) function. The output of adder 44 is then stored in bank 20 as new updated coefficients in accordance with the following equation:

$$ak_{new} = (1 - L)ak_{old} + \Delta dk$$

The new coefficients in bank 20 are then used to reprogram the active filter 14 as a ghost cancelling filter. The averaging processing is begun again during vertical blanking intervals using the new coefficients in bank 20 to acquire the new filtered GCR signals. A new different signal (e) is again processed to get a new dk signal as described above, and the new dk signal is combined with the old ak value. This creates a conversion action with dk equal to or approaching zero. Alternatively, the matched filter coefficients in the bank 24 can be loaded with an average received ghosted GCR signal. This implements the least mean squares algorithm.

When tuning in a new channel with ghosts, an initial accelerated convergence can be implemented. After the initial 8, or a multiple of 8, fields average is taken, and stored in the FIFO 32, several processing passes are made to speed up initial convergence, using only the data in the initial average. The ghosted video will be passed around the MAC 14 for a field's worth of time when processing for initial accelerated convergence.

An initial average of the received ghosted GCR is captured and held in the FIFO 32. As the following steps will overwrite the FIFO 32, the contents of the FIFO 32 are copied to the FIFO 36 via switch 37. No substraction of the reference GCR is done during this copy operation. The FIFO 36 is then played out through the MAC 14 using initial a bank 20 coefficients ak and the result is captured in the FIFO 32 once, no averaging being needed.

Data in the FIFO 32 and the reference GCR 40 are by subtractor 38 to make an e signal. This e signal is sent to the MAC 14 set to a matched filter with coefficients in the bank 24, to produce a dk signal, which passes through the shifters 46, 44, 42 to update the ak values in the bank 20. These new ak coefficients in the bank 20 are used to program the MAC 14, then the initial captured averaged GCR stored in the FIFO 36 is played through the MAC 14, the result being stored in the FIFO 32 without averaging. The process is repeated several times for a field's worth of time (the active video is bypassed, ghosted, during this time). When the time is used up, the live video is switched through the MAC 14 which is now programmed with the latest ak coefficients in the bank 20. A new averaged GCR, using GCRs filtered with the filter 14 set with the latest ak ghost cancellation coefficients, is collected to update the bank 20 coefficients using the earlier described method. (Initial averaged GCR will be lost and over-written, but it is no longer needed.)

The rate of convergence can be varied. One method is to measure the energy of the dk signal, and if dk is at a high signal level then the signal is not near convergence. A detector level measuring circuit 50 is used to make changes in the values Δ and L in shifter 42 and shifter 46, respectively. A fast rate is used for a high dk value (and also when first tuning in the channel) and a lower rate is used when near convergence. Further, circuitry can be added to the level measuring circuit 50 to detect sudden increases in the dk level. A decision can then be made whether to apply the new dk value or hold the new value to compare it with the level of the next dk value to see if the initial increased value is real or just a transient glitch. This provides a way to avoid having a transient bad dk value incorrectly altering the filtered coefficients in the ghost cancellation system. Also, when convergence is near, the updates can be frozen to stop random small changes in the coefficients. This will reduce the possibility that the small random changes will cause a flickering of the deghosted video on the TV display. Using a higher unfreeze level than that used to freeze would make a hysteresis loop, to avoid toggling if the level is hanging around the freeze threshold.

For circuit 34 determining positive or negative GCR signals, the filter 14 is set to a matched filter mode with coefficients from bank 24. With a received GCR input, the output of the filter 14 looks like a large impulse (representing the main GCR signal) and a few shorter impulses (representing ghosts). The positive and negative detector 34 determines the pixel timing and if the impulses are positive or negative. This in turn is used to control the averager adder 30 through the logic gate 28. The detector circuit 34 can be a threshold detector which will register the largest positive or negative value, and the largest absolute value is selected to decide positive or negative GCR. Also, the timing of this pulse can be compared with its expected location to determine if there is a pixel mistiming due to a jittery sync separator 54, and this information can be sent to the FIFO and mux controller 56 to adjust the timing of the FIFO 36 to avoid pixel mismatches in the averager FIFO 32. Mistimings will make the system function as though there are additional ghosts and syncs and bursts will not be properly averaged out, causing additional confusion as to the error signal (e) and the dk signal. This would upset the filter coefficients in bank 20 and could cause misprogramming of the active filter 14 and the appearance on the video screen of new ghosts, or even oscillations or instabilities in the filter.

The active filter 14 includes a feedforward FIR filter 14-1, a feedback IIR filter 14-2, an adder 14-3 and a two-position switch 14-4. In normal ghost cancellation mode and when calculations are being made during the vertical interval, with the coefficients from bank 20, the active filter 14 is set up as an FIR and IIR filter structure. This is determined by the setting of switch 14-4 to connect an input of the adder 14-3 to the output of the filter 14-2 thus making the filter 14-2 act as an IIR. The output of the adder 14-3 is the ghost cancellation mode output. As a matched filter, the switch 14-4 connects the input of adder 14-3 to ground without feedback from filter 14-2. Switch 14-4 could be implemented as an AND gate, high control line passing the signal and making filter 14-2 an IIR, low produces zeros and makes filter 14-2 an FIR. The matched filter output is taken from the output of filter 14-2 and feeds the positive/negative detector 34, when it is used for detecting GCR timing and polarity, and provides the dk signal output to the Δ shifter 42 and the level detector 50 when it is used for tap updates. Thus, when using the coefficients in bank 20, the active filter 14 is configured as an FIR and IIR in ghost cancel mode by switching switch 14-4 to allow the adder 14-3 to add the output of filter 14-2. The adder 14-3 output is the output feeding the FIFO 32 through averager 30 and the system output 18 through switch 16. To convert to a matched filter, the active filter is reconfigured to be a large FIR filter by switching the switch 14-4 to ground thus disabling the IIR action and serially connecting filters 14-1 and 14-2. The coefficients stored in bank 20 are provided to both filter 14-1 and filter 14-2 when the active filter is configured as a ghost cancelling filter.

While the active filter 14 is being used to do the GCR processing, the active video input is either shunted around the filter to the output during a portion of the vertical interval, or a locally generated vertical waveform from generator 58 is substituted during the vertical interval.

The illustrative algorithm updates filter coefficients based on the output of the IIR filter. As is well known, this algorithm may be unstable due to the inherent nolinearity in the updates of the feedback coefficients. The architecture can be easily extended to accommodate more stable algorithms, such as the one described in the co-pending patent Ser. No. 08/060,374, filed May 7, 1993 and assigned to the present assignee. The illustrative algorithm uses the U.S. GCR as an example. With modifications, the architecture can also be used with Japanese GCR and other GCRs.

There has been described a ghost cancellation system in which the active filter is continually tuned for ghost cancellation without requiring a signal processor or microprocessor. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of cancelling ghosts in video signals comprising the steps of
   a) providing an active filter having a ghost cancelling filtering function defined by a first set of coefficients ($ak_{old}$), said active filter having a signal input and a signal output, a feedforward FIR filter and an adder serially connected between said input and said output, a feedback IIR filter and a switch serially connected between an output of said adder and an input of said adder, said feedforward FIR filter and said feedback IIR filter having filtering functions defined by said new set of coefficients,
   b) applying a transmitted ghost cancellation reference (GCR) signal to said input of said active filter during a vertical blanking period to generate a filtered GCR signal at said output of said active filter, said step of applying being repeated a plurality of times to obtain an average value of said filtered GCR signal,
   c) comparing said filtered GCR signal to a ghostless GCR signal to obtain an error signal,
   d) adjusting said coefficients based on said error signal to obtain a first set of new coefficients ($ak_{new}$), and
   e) filtering video signals with said active filter using said new coefficients.

2. The method as defined by claim 1 wherein step (d) includes passing said error signal serially through said feedforward FIR filter and said feedback IIR filter with said switch disconnecting an output of said feedback IIR filter from said adder, said feedforward FIR filter and said feedback IIR filter cooperatively functioning as a matched filter for said error signal and producing a set of impulses (dk) which represent received ghost delays and coefficients as follows $$dk = \sum_{j=0}^{N} X(j) \cdot e(j + k)$$

where x(j) is time-reversed sequence of the coefficients in the bank (ideal GCR sequence), and e(j+k) is the difference between the received average GCR and the reference GCR.

3. The method as defined by claim 2 wherein said matched filter is defined by a second set of coefficients.

4. The method as defined by claim 2 wherein step (d) further includes
   attenuating and shifting said set of impulses dk by a value, Δ,
   attenuating and shifting said first set of coefficients ($ak_{old}$) by a function, 1-L, and
   obtaining said first set of new coefficients, $ak_{new}$, according to the relationship $$ak_{new} = (1-L)ak_{old} + \Delta dk$$

5. The method as defined by claim 1 wherein an accelerated convergence is obtained by using said average value of said filtered GCR signal obtained in step (b) repetitively to adjust Δ and L for convergence of new coefficients (ak$_{new}$).

6. The method as defined by claim 1 wherein steps b), c), and d) are repeated.

7. A ghost cancellation system for filtering out ghosts in a received video signal comprising
an active filter having a filtering function defined by a first set of coefficients (ak$_{old}$), said active filter having a input and a output, a feedforward FIR filter and an adder serially connected between said input of said output, a feedback IIR filter and a switch serially connected between an output of said adder and an input of said adder, said feedforward FIR filter and said feedback IIR filter having filtering functions defined by said coefficients.
means for applying a transmitted ghost cancellation reference (GCR) signal to said input of said active filter during a vertical blanking period to generate a filtered GCR signal at said output of said active filter,
averaging means for receiving and averaging a plurality of filtered GCR signals,
means for comparing said filtered GCR signal with a ghostless GCR signal to obtain an error signal,
means for adjusting said coefficients based on said error signal to obtain a first set of new coefficients (ak$_{new}$), and
means for applying received video signals to said active filter for removing ghosts in said video signals.

8. The ghost cancellation system as defined by claim 7 wherein said active filter is reconfigurable as a matched filter by passing said error signal serially through said feedforward FIR filter and said feedback IIR filter, said matched filter receiving said error signal and producing a set of impulses (dk) which represent received ghost delays and coefficients where $$dk = \sum_{j=0}^{N} X(j) \cdot e(j+k)$$

where x(j) is time-reversed sequence of the coefficients in the bank (ideal GCR sequence), and e(j+k) is the difference between the received average GCR and the reference GCR.

9. The ghost cancellation system as defined by claim 8 wherein said matched filter is defined by a second set of coefficients.

10. The ghost cancellation system as defined by claim 8 and further including a first attenuator and shifter for shifting said set of impulses, dk, by a value, Δ,
a second attenuator and shifter for shifting said set of coefficients (ak$_{old}$), by a function, 1-L, and
means for combining the outputs of said first and second attenuators and shifters to obtain said first set of new coefficients, ak$_{new}$, as follows:

$$ak_{new} = (1-L) ak_{old} + \Delta dk$$

11. The ghost cancellation system as defined by claim 10 and further including means for determining polarity of said received GCR signals and pixel timing, said means for determining polarity controlling said averaging means for receiving and averaging a plurality of filtered GCR signals.

12. The ghost cancellation system as defined by claim 11 wherein said means for determining polarity receives impulses from said active filter configured as a matched filter with coefficients based on said ghostless GCR signal whereby said active filter produces a first impulse representing a main GCR signal and a plurality of smaller impulses representing ghosts.

13. The ghost cancellation system as defined by claim 12 and further including means for detecting said set of impulses (dk), comparing said set of impulses with a previous set of impulses, and adjusting said values Δ and L accordingly.

14. The ghost cancellation system as defined by claim 13 and further including means for customizing said filter frequency response.

15. The ghost cancellation system as defined by claim 10 wherein an accelerated convergence is obtained by using repetitively said average value of said filtered GCR signal from said averaging means to adjust Δ and L for convergence of new coefficients (ak$_{new}$).

16. The ghost cancellation system as defined by claim 7 and further including means for customizing said filter frequency response.

* * * * *